Dec. 29, 1931.  G. W. McCUNE  1,838,564
SELF CENTERING REAMER HEAD
Filed May 28, 1928   2 Sheets-Sheet 1

Inventor
George W. McCune
By Wooster & Davis
Attorneys.

Dec. 29, 1931. G. W. McCUNE 1,838,564
SELF CENTERING REAMER HEAD
Filed May 28, 1928 2 Sheets-Sheet 2

Inventor
George W. McCune
By Wooster & Davis
Attorneys

Patented Dec. 29, 1931

1,838,564

UNITED STATES PATENT OFFICE

GEORGE W. McCUNE, OF BRIDGEPORT, CONNECTICUT, ASSIGNOR OF ONE-HALF TO JOHN A. CORNELL, OF BRIDGEPORT, CONNECTICUT

SELF CENTERING REAMER HEAD

Application filed May 28, 1928. Serial No. 281,155.

This invention relates to a reamer head for boring or reaming the bores of guns and the like, and has for an object to provide an improved reamer head which will automatically center itself in the bore regardless of changes or variations in the diameter of the bore, and therefore, will prevent boring the gun or other member off center.

It is also an object of the invention to provide a boring head in which the cutter is automatically adjusted to correspond with variations in the diameter of the bore to thus bore the opening uniformly.

With the foregoing and other objects in view, the invention consists in certain novel features of construction, combinations and arrangements of parts as will be more fully described in connection with the accompanying drawings. In these drawings, Fig. 1 is a longitudinal section through the head.

Figure 1:
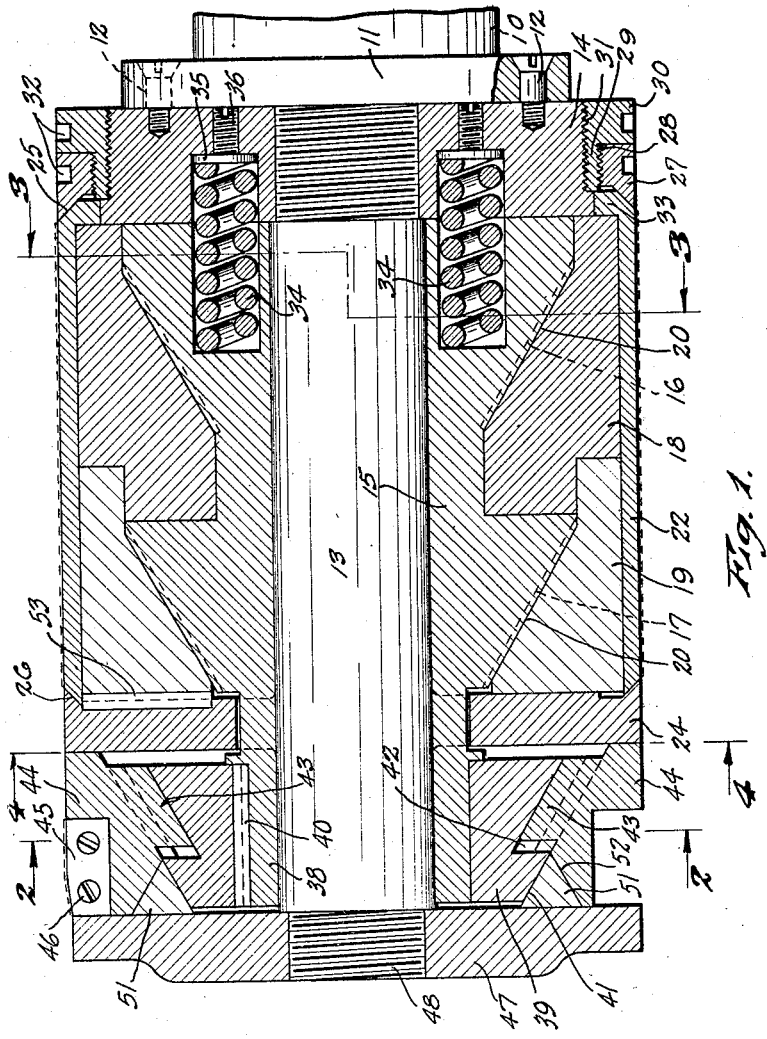
Figure 4:
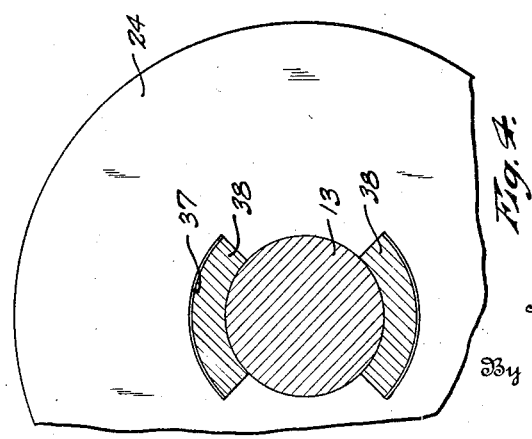
Fig. 4 is a partial section substantially on line 4—4 of Fig. 1.
Figure 2:
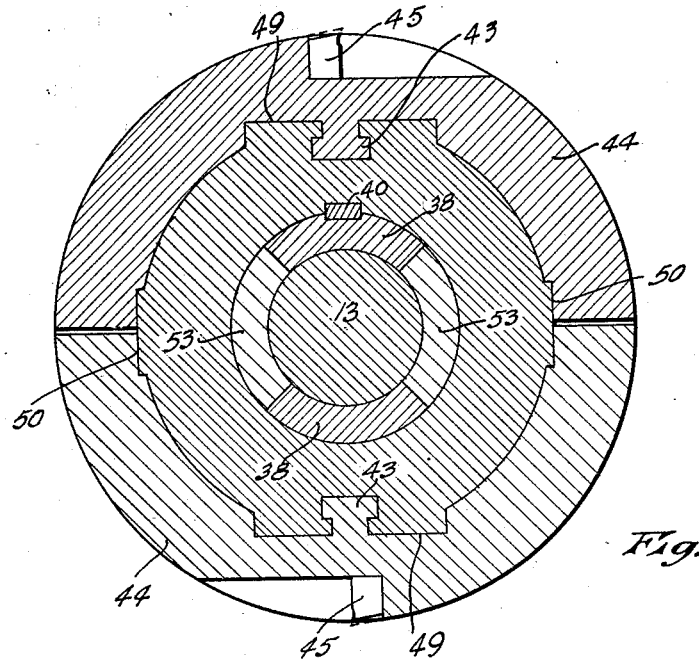
Fig. 2 is a transverse section thereof substantially on line 2—2 of Fig. 1.
Figure 3:
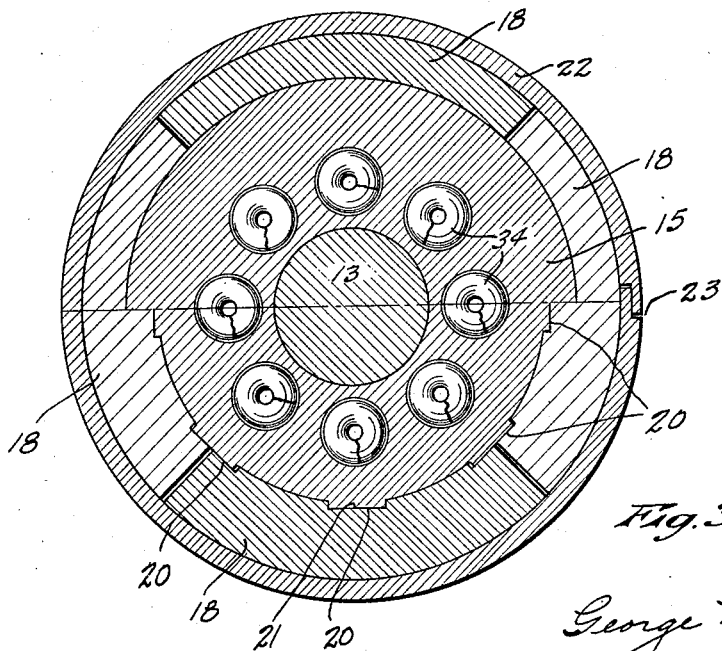
Fig. 3 is a transverse section substantially on line 3—3 of Fig. 1.

In boring or reaming large guns of relatively long bores it will be evident that it is practically impossible to provide a boring bar of sufficient stiffness to always maintain the boring head central with the bore, and therefore, the bore will be reamed off center. In an attempt to overcome this objection guiding blocks of wood or similar material have been applied to the head of a diameter corresponding to that of the bore, but it will be evident that this will not compensate for variations in the diameter of the bore due to changes in temperature or other causes, and therefore, if the temperature should rise and the bore increased by expansion of the metal this head would ride on the lower part of the bore and off center, so that the bore would be reamed off center. This is because after the bore has increased in diameter the reamer head still rests on the bottom, and therefore it will be evident if the center of the head was coincident with the center of the bore before the expansion of the bore it will now be below the center of the bore, that is, off center. I have overcome these difficulties by providing a construction which will automatically expand and contract to correspond with variations in the diameter of the bore and will automatically maintain the central axis of the head coincident with the axis of the bore. Thus it automatically centers itself so that the bore is reamed on the center. I have also associated with this automatic centering means, means for automatically adjusting the cutter or cutters to correspond with variations in the diameter of the bore so as to give a uniform cut throughout the entire length thereof and give a uniform bore which is cut on the proper center. In other words if the cutter was not adjusted, when the bore expands a smaller cut will be taken because the bore is larger, and therefore as a larger cut is taken when the gun is cooler and the bore is smaller than when the gun is warmer and the bore is larger, it is evident that the bore would not be uniform, and after the temperature of the gun has increased the portion of the bore cut when the gun was cooler would be larger than the portion cut when the gun was warmer.

In the construction shown in the drawings, 10 represents the boring rod which may be of any desired length and it may have a flange 11 to which the head may be secured by any suitable means, such as screws 12. The head also includes a central cylindrical member 13 which may be threaded into the end of the bar, and threaded onto this member is a head plate 14. Mounted to slide longitudinally on the cylindrical member 13 is an adjusting member 15 which is preferably continuous and has a central cylindrical bore to correspond to the member 13. The member 15 has inclined conical surfaces 16 and 17 which are enclosed by a plurality of blocks or segments 18 and 19. There may be any desired number of these segments though four has been found very satisfactory. That is, there are four segments 18 and four segments 19, and they have correspondingly tapered interior surfaces to engage the conical surfaces 16 and 17. If the conical surfaces alone are used there is more or less a tendency of the surfaces to bind and I, therefore, prefer to provide on the member 15 flats 20 of the same inclination as the conical surfaces engaging similar flats 21 on the segmental members. This reduces the liability of the surfaces to bind and gives freer action. The conical surfaces 16 and 17 are inclined at the same angle to the axis of the head, and the segments 18 and 19 are enclosed by a cylindrical, resilient, split casing 22 which is of substantially the diameter of the bore to be reamed. This casing is longitudinally slit on one side, as indicated at 23, so that the casing may expand or contract within limits. The casing is made of greater diameter than that of the bore to be reamed, say about three-sixteenths of an inch. Then a longitudinal strip is cut out of it at one side and it is then compressed, ground and lapped to size.

The segmental members 18 and 19 are guided at their opposite ends by the head or plate 14 and the end plate 24, and therefore, have radial movement only. A key 53 may be inserted in opposed grooves in these members and the adjacent heads to prevent the members turning. The opposite ends of the casing 22 are beveled, as indicated at 25 and 26, and engaging corresponding bevels on the ring nut 27 and the end plate 24 respectively. The ring nut 27 is threaded at 28 on the reduced portion 29 of the lock nut 30 which is threaded at 31 to end member 14, and the ring nuts 27 and 30 may be provided with sockets 32 to receive a spanner wrench or other suitable tool for rotating these members. The casing 22 has an inwardly extending flange 33 which may be engaged by the extension 29 on the nut 30 so that the casing 22 will be forced by this nut against the end member 24. The members 24 and 27 cooperate with the bevels 25 and 26 to limit the expanding movement of the casing 22. Thus by adjusting the nut 30 the casing 22 is forced against the beveled surface on the member 24 until the proper maximum diameter is secured at that end of the casing. Then the nut 27 is adjusted against the opposite beveled end of the casing 22 to bring that to the same diameter. These beveled surfaces at the opposite ends of the member 22 will, therefore, limit the expanding movements of the casing and will prevent its expanding beyond a given diameter.

Resilient means is provided tending to shift the member 15 on the cylindrical member 13 to expand the casing 22. This means in the arrangement shown comprises a series of coiled springs 34 seated in opposed sockets in the end of the member 15 and the adjacent side of the member 14. At their outer ends these springs rest against plates 35 which may be adjusted by screws 36 to vary the tension of the springs. Any suitable number of springs may be used to secure the proper force, there being eight of these springs in the structure illustrated.

The plate 24 has a pair of segmental openings 37 on opposite sides of the member 13 through which similarly shaped extensions 38 of the member 15 extend. These members are secured to a conical adjusting block 39 so that this block will move with the member 15. The block may be secured to these extensions by any suitable means such as a forced fit or other means, and it may be keyed to them as shown at 40, to prevent turning of the block. The block has a conical outer surface 41 inclined to the axis of the head at the same angle as the cam surfaces 16 and 17. This inclined surface of the block also has T-slots 42 to receive similar T-shaped ribs 43 on cutter supports 44. There may be a cutter support for each cutter 45 although more than one cutter may be mounted on a support if found desirable. In the present arrangement there are two cutters arranged on opposite sides of the head and a support 44 for each cutter. The cutters may be mounted on the supports by any suitable means, such as screws 46. The cutter supports 44 are guided for radial movement between the stationary plate 24 and outer head 47 secured to the member 13 as by threading it to the member 13, as indicated at 48. To give a better bearing surface of the supports 44 on the block 39 these two elements may be provided with a flat surface 49 on opposite sides of the T-slot and rib, which flat is inclined at the same angle as the conical surface of the block and cam surfaces 16 and 17. There may also be similarly inclined flats 50 at the sides of the support to form a bearing surface in all positions of adjustment of these supports. Filling in members 53 may be placed between the extensions 38 within the block 39.

The operation is as follows: The member 13 is cylindrical and is coaxial with the axis of the head. As the member 15 has a cylindrical bore in the member 13 it is always coaxial with it, and as the cam surfaces 16 and 17 are conical the segments 18 and 19 all have the same relation to the axis of the head and are uniformly spaced therefrom. Therefore, the outer casing 22 is always substantially cylindrical and concentric with the member 13. This casing 22 fits the surface of the bore of the gun or other object to be reamed and is held in close contact with it by the action of the springs 34 which tend to shift the member 15 to cause the cam surfaces 16 and 17, 20 and 21 to force the members 18 and 19 outwardly and expand the casing. These springs, however, will also permit the member 15 to be forced to the right, as viewed in Fig. 1, if the bore of the article being worked reduces in diameter and thus compresses somewhat the casing 22. The casing 22, therefore, automatically expands and contracts to correspond with variations in the diameter of the bore and its outer surface always fits the surface of the bore. The head is, therefore, automatically centered and its axis automatically maintained coincident with the axis of the bore regardless of variations in the diameter of the bore.

Still further as the adjusting block 39 for the cutters 45 is connected to the member 15 the block 39 is shifted longitudinally of the head to correspond with the movements of the member 15. Therefore, as the casing 22 expands or contracts to correspond with variations in the diameter of the bore the cutters 45 move outwardly and inwardly equal amounts to correspond with this expansion or contraction of the casing, and therefore, gives a uniform reaming operation for the bore throughout its entire length. To equalize the pressures incident to the operation of the cutters a tapered ring 51 may be inserted between the block 39 and the cutter supports 44. This is tapered in opposite direction from the surface 41, as indicated at 52, so that part of the compressive force caused by the cutters is transmitted to the head 47.

Having thus set forth the nature of my invention, what I claim is:

1. In a reamer head, a radially movable cutter blade, centering means for the head at the rear of said cutter blade comprising radially movable members and spring pressed means for expanding said members against the wall of the bore, said spring pressed means also being connected to said blade whereby the blade is contracted or expanded with said movable members.

2. In a reamer head, a radially movable cutter, a split cylindrical casing to the rear of the cutter to fit the bore, means to expand the casing, resilient means tending to operate said expanding means to hold the casing in engagement with the bore, means capable of shifting the cutter in and out, and an operative connection between the expanding means and the cutter shifting means so that movement of the expanding means shifts the cutter in and out to correspond with changes in the diameter of the bore.

3. In a reamer head, a boring cutter carried by said head, a split cylindrical casing to the rear of the cutter engaging the walls of the bore being reamed, means cooperating with said casing to center the head with respect to the bore, resilient means, movable means operated by the resilient means tending to expand the casing and maintain it in engagement with the walls of the bore regardless of variations in the diameter of the bore, and a connection from the said movable means to the cutter to shift the cutter in and out with variations in the diameter of the casing.

4. In a reamer head, a cylindrical member concentric with the axis of the head, an adjusting member mounted to slide longitudinally on the cylindrical member provided with cam surfaces inclined to the axis of the member, an expandable cylindrical casing to engage and fit the bore being reamed, members enclosed by the casing and engaging said cam surfaces for operation thereby, resilient means tending to shift the adjusting member to expand the casing, a boring cutter carried by the head forwardly of said casing, and a connection from the adjusting member to the cutter to move it outwardly as the casing is expanded.

5. In a reamer head, a guiding body portion including a split casing to engage the surface of the bore being reamed and capable of expanding and contracting with variations in the diameter of the bore, resilient means tending to expand said casing so as to keep it the same size as the bore, a radially movable cutter carried by said head forwardly of the casing, and means operated by said resilient means capable of shifting the cutter in and out.

6. In a reamer head, a guiding body portion including a split resilient casing to engage and fit the bore being reamed, means including cam surfaces for expanding said casing, resilient means tending to operate said expanding means to expand the casing so as to keep it the same size as the bore, a radially movable cutter forwardly of the casing, and means connected to said expanding means having similar cam surfaces for shifting the cutter.

7. In a reamer head, a cylindrical member concentric with the head, an adjusting member having a cylindrical bore to fit the cylindrical member and shiftable longitudinally thereon, said adjusting member having inclined cam surfaces, a split cylindrical casing to fit the bore, means enclosed by the casing to cooperate with said cam surfaces to expand the casing, resilient means tending to shift the adjusting member to expand the casing, a radially movable cutter, an adjusting block secured to the adjusting member and movable therewith having inclined cam surfaces at the same angle as those on the adjusting member, and means for cooperating with the cam surfaces on the block to adjust the position of the cutter.

8. In a reamer head, a guiding body portion including a split casing to engage the surface of the bore being reamed and capable of expanding and contracting with variations in the diameter of the bore, resilient means tending to expand said casing, adjustable means for limiting the expansion of said casing, a radially movable cutter carried by said head forwardly of the casing, and means operated by said resilient means for adjusting the position of the cutter to correspond with variations in the size of the casing.

9. In a reamer head, a cylindrical member concentric with the head, an adjusting member having a cylindrical bore to fit the cylindrical member and shiftable longitudinally thereon, said adjusting member having inclined cam surfaces, a split cylindrical casing to fit the bore and provided with beveled surfaces at its opposite ends, means enclosed by the casing to cooperate with said cam surfaces to expand the casing, adjustable means cooperating with said beveled surfaces to limit the expansion of the casing, resilient means tending to move the expanding member to expand the casing, a radially movable cutter, and means operated by said expanding member to adjust the position of the cutter.

In testimony whereof I affix my signature.

GEORGE W. McCUNE.